United States Patent
Yi et al.

(10) Patent No.: US 9,202,021 B2
(45) Date of Patent: Dec. 1, 2015

(54) LICENSE VERIFICATION METHOD AND APPARATUS, AND COMPUTER READABLE STORAGE MEDIUM STORING PROGRAM THEREFOR

(71) Applicant: Samsung Electronics Co. Ltd., Suwon-si, Gyeonggi-do (KR)

(72) Inventors: Jungbae Yi, Incheon (KR); Jaehyun Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 13/921,714

(22) Filed: Jun. 19, 2013

(65) Prior Publication Data

US 2013/0347118 A1    Dec. 26, 2013

(30) Foreign Application Priority Data

Jun. 20, 2012  (KR) ........................ 10-2012-0066116

(51) Int. Cl.
- *G06F 21/00* (2013.01)
- *G06F 21/10* (2013.01)
- *G06F 21/50* (2013.01)

(52) U.S. Cl.
CPC .............. *G06F 21/10* (2013.01); *G06F 21/105* (2013.01); *G06F 21/50* (2013.01)

(58) Field of Classification Search
CPC ....... G06F 21/10; G06F 21/105; G06F 21/12; G06F 21/50; G06F 21/51
See application file for complete search history.

(56) References Cited

U.S. PATENT DOCUMENTS

| | | | |
|---|---|---|---|
| 2008/0276314 A1 | 11/2008 | Wollnik et al. | |
| 2010/0241469 A1* | 9/2010 | Weigert | 705/7 |
| 2011/0289003 A1 | 11/2011 | Womack et al. | |

FOREIGN PATENT DOCUMENTS

| | | |
|---|---|---|
| JP | 3654165 B2 | 6/2005 |
| KR | 10-2010-0060871 A | 6/2010 |
| KR | 10-2010-0100492 A | 9/2010 |
| WO | 2011-031129 A1 | 3/2011 |

* cited by examiner

*Primary Examiner* — Edward Zee
(74) *Attorney, Agent, or Firm* — Jefferson IP Law, LLP

(57) ABSTRACT

A method and apparatus for verifying licenses of binary files and to a computer readable storage medium storing a program realizing license verification is provided. The method includes obtaining a binary file, extracting a character string to be searched for from the obtained binary file, and comparing the extracted character string against a knowledge base created according to a license to be verified, an apparatus capable of executing the license verification method, and a computer readable storage medium storing a program realizing the license verification method.

17 Claims, 8 Drawing Sheets

LICENSE VERIFICATION METHOD AND APPARATUS, AND COMPUTER READABLE STORAGE MEDIUM STORING PROGRAM THEREFOR

PRIORITY

This application claims the benefit under 35 U.S.C. §119 (a) of a Korean patent application filed on Jun. 20, 2012 in the Korean Intellectual Property Office and assigned Serial No. 10-2012-0066116, the entire disclosure of which is hereby incorporated by reference.

BACKGROUND OF THE INVENTION

1. Field of the Invention

The present invention relates to a method and apparatus for license verification and a computer readable storage medium storing a program therefor. More particularly, the present invention relates to a method and apparatus that verify licenses of binary files and to a computer readable storage medium storing a program realizing license verification.

2. Description of the Related Art

With an increase in an amount of Free and Open Source Software (FOSS) with verified quality, program developers may use FOSS components to develop products. Use of FOSS components enables program developers to reduce development time, reduce development costs, and increase market share by reducing time to market. Use of high-quality FOSS may also contribute to reduction of investment costs in product development. When FOSS components are embedded or used in a product, it should be verified that the FOSS components comply with license agreements so as to avoid litigation by open source license monitoring bodies and to reduce the risk of damaging corporate and product brand images.

In most cases, the target of license verification is software source code, and license verification is performed on a file basis using a commercial tool, for example, ProtexIP. However, as existing commercial verification tools do not provide a license verification scheme for binary files contained in open source code, they may be inadequate for precise license verification and may leave room for the risk of verification failure.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus that verify licenses of binary files and a computer readable storage medium storing a program realizing license verification.

In addition, an aspect of the present invention is to provide a knowledge base to be matched with binary files, provides a method and apparatus that verify licenses of binary files by comparing the binary files with files stored in the knowledge base, and provides a computer readable storage medium storing a program realizing license verification.

In accordance with an aspect of the present invention, a license verification method is provided. The method includes obtaining a binary file; extracting a character string to be searched for from the obtained binary file, and comparing the extracted character string against a knowledge base created according to a license to be verified.

In accordance with an aspect of the present invention, a license verification apparatus is provided. The apparatus includes an input unit receiving a license verification request, and a control unit obtaining, upon reception of the license verification request, a binary file, extracting a character string to be searched for from the obtained binary file, and comparing the extracted character string against a knowledge base created according to a license to be verified.

In accordance with an aspect of the present invention, a computer readable storage medium may store a program realizing a license verification method that includes obtaining a binary file, extracting a character string to be searched for from the obtained binary file, and comparing the extracted character string against a knowledge base created according to a license to be verified.

According to an aspect of the present invention, the license verification method and apparatus, and computer readable storage medium storing a program realizing license verification may enhance accuracy and efficiency of license verification by expanding the scope of verification of open source code to binary files.

In addition, according to an aspect of the present invention, the license verification method and apparatus, and computer readable storage medium storing a program realizing license verification may reduce resources and time needed for license verification.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention may be applied to electronic devices performing license verification of binary files. More specifically, exemplary embodiments of the present invention may be applied to electronic devices or services performing license verification of binary files embedded in home appliances such as mobile devices, Televisions (TV)s, printers, refrigerators or any other similar and/or suitable electronic device.

Technical terms used in the description are to describe specific exemplary embodiments of the present invention without limiting the subject matter of the present invention. Accordingly, the meaning of specific terms or words used in the specification and the claims should not be limited to the literal or commonly employed sense, but should be construed in accordance with the spirit of the invention.

Figure 1:
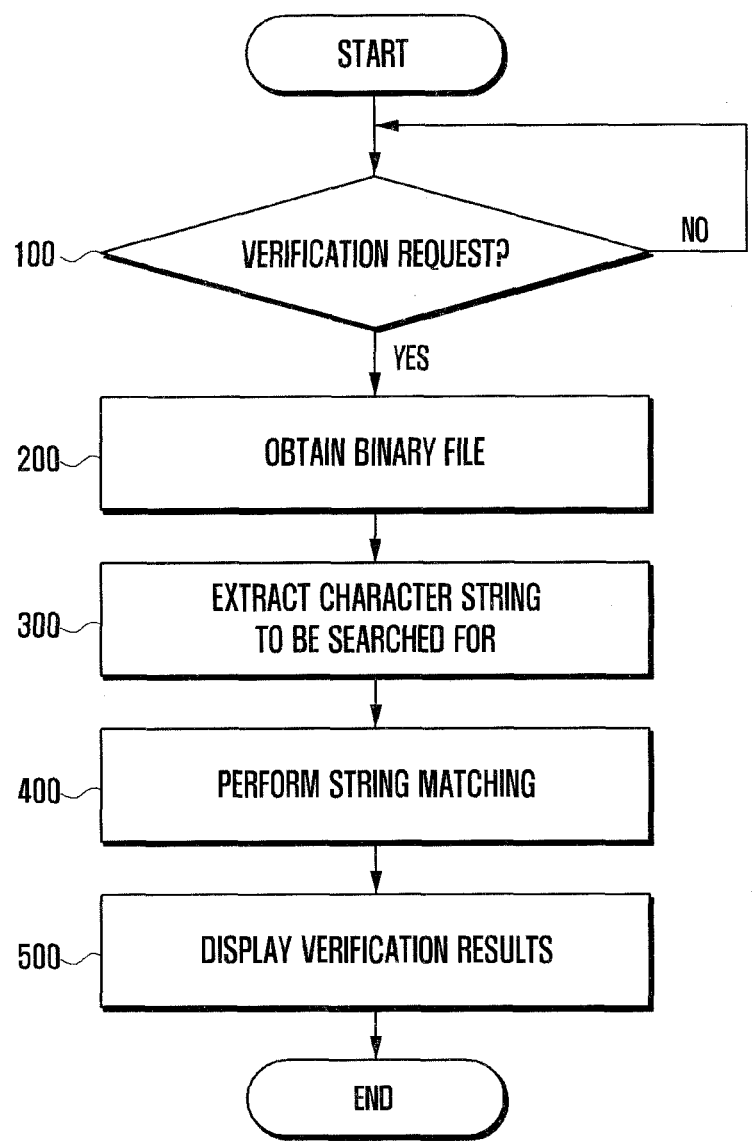
FIG. 1 is a flowchart for a license verification method according to an exemplary embodiment of the present invention.

FIG. 1 is a flowchart for a license verification method according to an exemplary embodiment of the present invention.

Referring to FIG. 1, the license verification method of the present exemplary embodiment of the present invention may include the following sequence of steps. First, the verification apparatus checks whether a verification request is issued in step 100. Next, the verification apparatus obtains a binary file in step 200. Then, the verification apparatus extracts a character string to be searched for in step 300. In step 400, the verification apparatus performs string matching, and then in step 500 displays verification results. Steps 100 to 500 of FIG. 1 will be described below in further detail.

Referring to step 100, the verification apparatus may determine whether a verification request is issued for a verification target. A verification request may be issued by a user input, or may be automatically generated by the verification apparatus in some cases. The verification apparatus may determine selection of a verification target. The verification target may be one of various types of entities such as a file, folder, a compressed file, a package file, or any other similar and/or suitable types of entities. The verification target may be a binary file or may include a binary file. The verification apparatus may receive information specifying a verification target. The verification apparatus may determine a verification target according to a user input, or may provide a User Interface (UI) or file search window for selecting a verification target.

Figure 2:
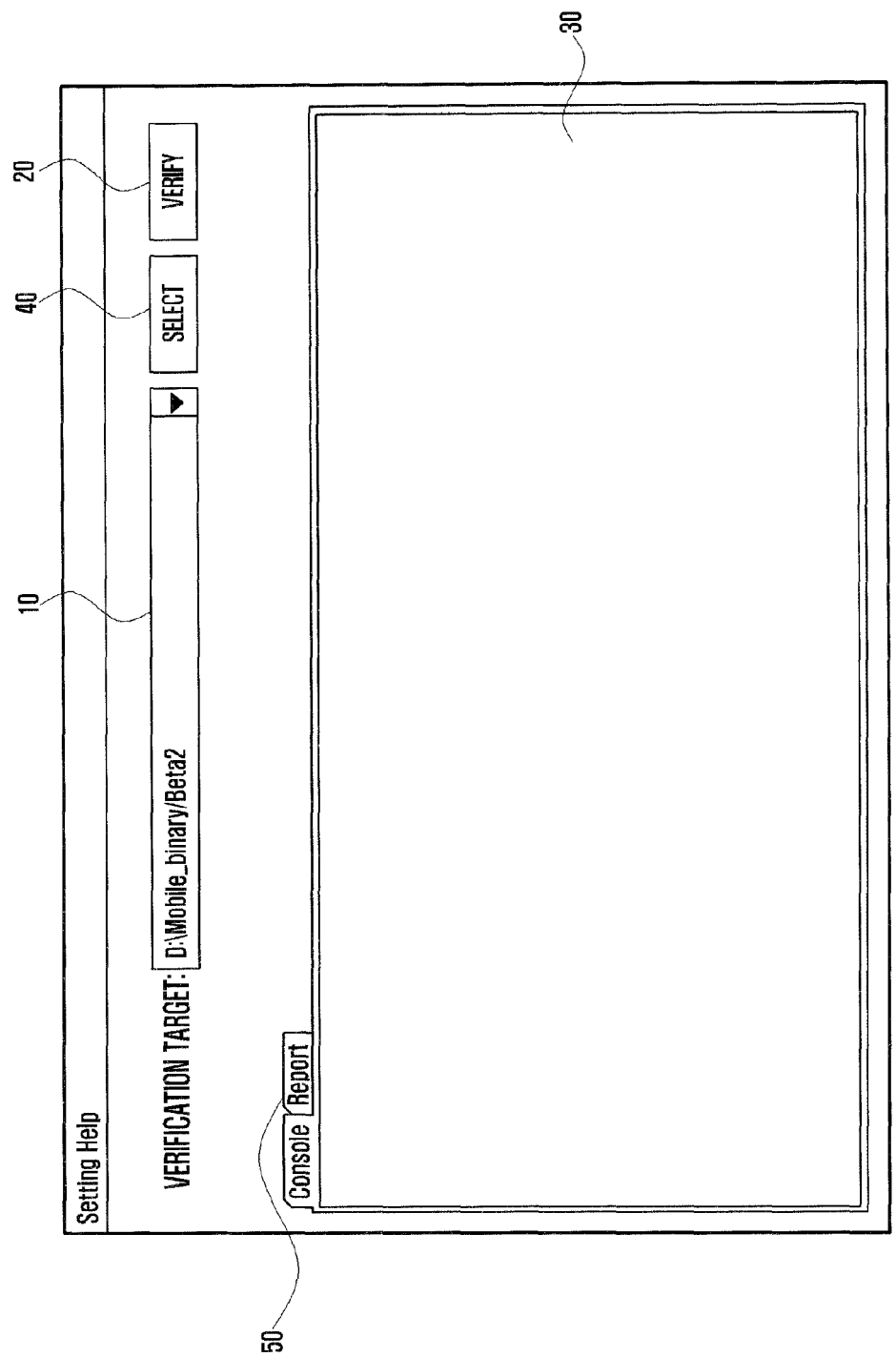
FIG. 2 illustrates a User Interface (UI) screen for license verification according to an exemplary embodiment of the present invention.

FIG. 2 illustrates a UI screen for license verification according to an exemplary embodiment of the present invention.

Referring to FIG. 2, the verification apparatus may deactivate a verification request input object 20 when a verification target is not selected. In addition, the verification apparatus may determine whether a license for verification is selected. The license may be at least one of open source licenses provided by the knowledge base, such as General Public License (GPL), Lesser GPL (LGPL), Berkeley Software Distribution (BSD), Mozilla Public License (MPL), Apache, or any other similar and/or suitable knowledge base or license repository. The verification apparatus may display a UI screen enabling a user to enter a verification request. As shown in FIG. 2, the verification apparatus may output a verification target selection object 10, the verification request input object 20, and a verification information display object 30 on the UI screen of FIG. 2.

The verification target selection object 10 is used to receive a target for license verification from the user. The verification target selection object 10 may include a selection object 40 for selecting a verification target, and a verification target display object (not shown) for displaying a path, name and extension of a selected verification target. The verification target selection object 10 may be displayed as text, an icon, a button, an image, a window or a combination thereof. The verification target selection object 10 may be represented as a separate UI or file search window for selecting a verification target in response to entering the selection object.

The verification request input object 20 is used to generate a verification request for a given verification target. During verification, the verification request input object 20 may be used as a verification halt request input object in order to halt a verification request. The verification request input object 20 may be displayed as text, an icon, a button, an image, a window or a combination thereof.

The verification information display object 30 is used to output status information regarding a verification target. For example, the verification information display object 30 may output information on at least one of a list of files constituting the verification target, a list of binary files, the type of the verification target, decompression, unpacking, and decompilation states of the verification target, or any other similar and/or suitable types of information. During verification, the verification information display object 30 may output verification progress information regarding at least one of the current stage among all verification stages, the number of files to be verified, a list of files being verified, and a list of character strings being checked.

After verification, the verification information display object 30 may output a verification result report 50 including at least one of a list of verified files, a list of checked character strings, a list of verified licenses, a list of files matching a license, the number of files matching a license, a list of functions or strings matching a license, the level of confidence of license matching, and any other similar and/or suitable verification results. The verification information display object 30 may include a window in which verification information is output, and may be presented as text, an icon, a button, an image, a window or a combination thereof.

Although the UI screen has been described with reference to FIG. 2, the present invention is not limited to the UI screen shown in FIG. 2, and may output more or less information than that of FIG. 2 in various forms of text, an icon, a button, an image, a window and a combination thereof.

As shown in FIG. 1, when it is determined that a verification request is issued in step 100, then the verification apparatus obtains binary files in step 200. The verification apparatus may obtain files from the verification target. In particular, the verification apparatus may obtain binary files from the verification target.

Figure 3:
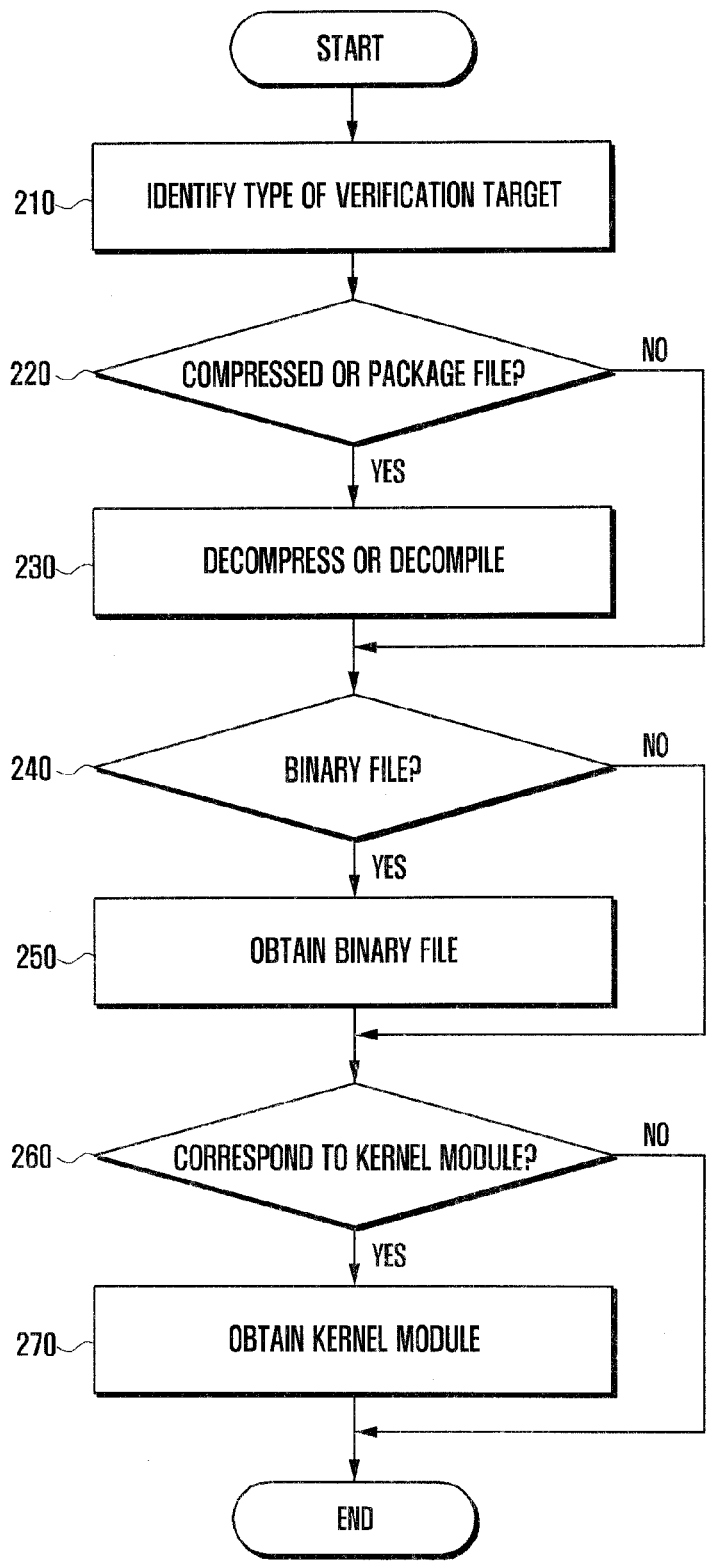
FIG. 3 is a flowchart of a procedure for binary file acquisition according to an exemplary embodiment of the present invention.

FIG. 3 is a flowchart of a procedure for binary file acquisition according to an exemplary embodiment of the present invention.

Referring to FIG. 3, the verification apparatus identifies the type of the verification target in step 210. The verification target may be a file, a folder, a compressed file, a package file, or any other similar and/or suitable type of target that may be verified. For example, the verification target may be a kernel module for the Linux kernel or may include a kernel module.

The verification apparatus determines whether the verification target is of a compressed file type or package file type in step 220. A compressed file is created by compressing multiple files into a single file, and may be separated into multiple files through decompression. A package file is created by packaging multiple files into a single file, and may be separated into multiple files through decompression, unpacking or decompilation. A compressed file or package file may have an extension such as .apk, .dpkg or .rpm, or may be a rootfs image file. Here, multiple files constituting one compressed file or package file may include a binary file.

When it is determined that the verification target is of a compressed file type or package file type in step 220, then the verification apparatus decompresses or decompiles the verification target in step 230. The verification apparatus may separate a compressed file or package file into multiple constituent files by decompressing, unpacking or decompiling the compressed file or package file. The multiple constituent files obtained by decompression, unpacking or decompilation may include at least one binary file.

Next, the verification apparatus determines whether the verification target is of a binary file type in step 240. A binary file is a file composed of binary data, and may be an executable file or library file installed in a terminal with an extension such as .a, .so, .lib, .dll, .exe or any other suitable and/or similar type of file and extension. A resource file, such as an image or multimedia file, may be regarded as not being a binary file. The verification apparatus may determine whether the verification target is a binary file, or may determine, when the verification target is a folder, whether the folder contains a binary file. The verification apparatus may also determine whether a binary file is present in multiple files separated from a compressed file or package file.

After it is determined, in step 240, that the verification target is of a binary file type, then the verification apparatus obtains a corresponding binary file in step 250. When the verification target is of the binary file type, then the verification apparatus may obtain the verification target itself. When the verification target is a folder, the verification apparatus may obtain a binary file contained in the folder. The verification apparatus may also obtain a binary file from multiple files separated from a compressed file or package file. Furthermore, the verification apparatus may display a list of obtained binary files on the UI screen. The verification apparatus may output a list of obtained binary files in a window of the verification information display object 30 as text, icons, buttons, images, windows or a combination thereof.

Next, the verification apparatus determines whether the verification target corresponds to a kernel module in step 260. A kernel module is a program realizing or executing a specific function of the kernel, such as a device driver loaded on or unloaded from the kernel according to a user's need. A kernel module enables the user to easily extend kernel functionality without restarting the operating system. A kernel module may have a library file extension such as .ko or any other similar and/or suitable file extension.

A kernel module may be used to extend the file system and device drivers. A kernel module may be written using a kernel Application Programming Interface (API), and may be created as a binary file in a build. Kernel APIs may be classified as GPL and non-GPL, and the license type may be determined according to a used Kernel API. The verification apparatus may determine whether the verification target is a kernel module. The verification apparatus may also determine whether a binary file uses a kernel module via a system call.

After it is determined, in step 260, that the verification target is associated with a kernel module, then the verification apparatus obtains a corresponding kernel module in step 270. When the verification target is a kernel module, then the verification apparatus may obtain the kernel module. The verification apparatus may obtain kernel modules separately from binary files and may display a list of obtained kernel modules on the UI screen.

Referring again to FIG. 1, after step 200, the verification apparatus extracts a character string to be searched in step 300. The verification apparatus may extract a character string usable for license verification from a binary file. In addition to a binary file, the verification apparatus may extract a character string to be searched from a kernel module. The verification apparatus may temporarily store a list of extracted character strings.

A binary file contains binary data, some of which may correspond to characters. For example, some binary data may correspond to American Standard Code for Information Interchange (ASCII) characters, and consecutive ASCII characters may form a character string. Characters contained in a binary file may be meaningful for license verification, and may include at least one of numerals, Hangul characters, English characters, special symbols such as ',' '_' '*', '(',')', or any other similar and/or suitable type of characters, icons, punctuation marks, and/or symbols.

Characters contained in a binary file may be ASCII characters. For example, characters contained in a binary file may have bit patterns corresponding to ASCII characters, except for non-ASCII characters such as control commands and a "null" character. Character strings contained in a binary file may be composed of a function name, a character string, a package name and an API name added to the file to deal with a specific license. The verification apparatus may extract a character string from a binary file, i.e. the verification target, by asciifying binary data contained in the binary file, and may add the extracted character string to a list of character strings.

The verification apparatus may extract at least one character string by asciifying all binary data of a binary file. Here, the verification apparatus may extract binary data itself instead of a character string. The verification apparatus may extract at least one character string from a binary file being the verification target, and may add the extracted character string to a list of character strings. An extracted character string may include at least one of a function, symbol data and a string corresponding to a specific license. The verification apparatus may extract character strings using system utilities such as "readelf", "strings", "nm" or any other similar and/or suitable system utilities.

After extracting the character string to be searched for in step 300, the verification apparatus performs string comparison in step 400. The verification apparatus may use a knowledge base to determine whether an extracted character string corresponds to a specific license. For example, the verification apparatus may determine whether each entry of the list of extracted character strings is present as a string composed of preset characters in the knowledge base.

The knowledge base may be formed on the basis of a license to be verified. The knowledge base may contain at least one character string corresponding to a specific license. For example, the knowledge base may contain at least one of a package name, a function and a string corresponding to a license and that is usable by the verification target. The knowledge base may be composed of binary data corresponding to character strings instead of character strings. Separate knowledge bases may be built for multiple licenses, and each knowledge base may contain at least one character string for the corresponding license.

For a kernel module, a separate knowledge base may be built so as to contain at least one function name, a character string and an API name, enabling the kernel module to correspond to a specific license. The knowledge base may be referred to as a dictionary, a database or a component pool according to circumstances. The verification apparatus may store a pre-built knowledge base before initiation of license verification. The verification apparatus may modify, update and manage the knowledge base according to a user's request or autonomously. The verification apparatus may determine whether an extracted character string is present in the knowledge base in order to determine whether the character string corresponds to the license.

Figure 4:
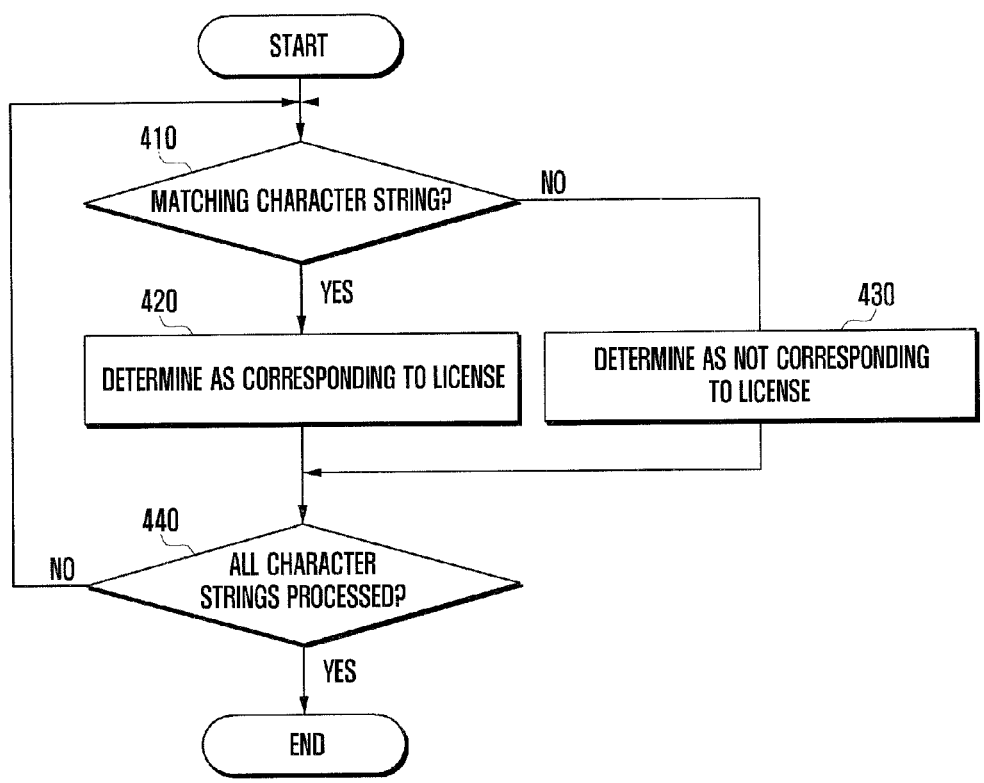
FIG. 4 is a flowchart of a procedure for character string verification according to an exemplary embodiment of the present invention.

FIG. 4 is a flowchart of a procedure for character string verification according to an exemplary embodiment of the present invention.

Referring to FIG. 4, the verification apparatus determines whether a matching character string is present in the knowledge base in step 410. The verification apparatus may determine whether a matching character string is present in the knowledge base on the basis of extracted character strings. The verification apparatus may compare the extracted character string with character strings stored in the knowledge base in order to determine presence of a matching character string. When binary data, instead of a character string, is extracted, then the verification apparatus may determine presence of matching binary data in the knowledge base.

In order to determine presence of a matching character string, the verification apparatus may perform string comparison that may be not performed on the basis of extracted character strings, but, rather, may be performed on the basis of character strings stored in the knowledge base. For example, the verification apparatus may determine whether a character string in the knowledge base is present in the list of extracted character strings. The verification apparatus may use a system utility in order to determine the presence of a matching character string.

After it is determined, in step 410, that a matching character string is present, then the verification apparatus determines that the character string corresponds to the license in step 420. When a character string matching a character string extracted from a binary file, i.e., the verification target, is present in the knowledge base, then the verification apparatus may determine that the character string corresponds to the license to be verified. The verification apparatus may create a list of character strings corresponding to the license and may temporarily store the list.

On the other hand, if it is determined, in step 410, that a matching character string is not present, then the verification apparatus determines that the extracted character string does not correspond to the license in step 430. When a character string matching a character string extracted from a binary file is present in the knowledge base, then the verification apparatus may determine that the extracted character string does not correspond to the license to be verified. Accordingly, the verification apparatus may create a list of character strings not corresponding to the license and temporarily store the list.

After either of step 420 or 430, the verification apparatus determines whether all the extracted character strings have been processed in step 440. The verification apparatus may determine whether all the extracted character strings have been compared so as to examine correspondence with a given license. When all of the extracted character strings have not been processed, then the verification apparatus returns to step 410 so as to repeatedly perform string matching. The verification apparatus may repeatedly perform string matching until all of the extracted character strings have been processed in order to examine correspondence with the given license.

When all the extracted character strings have been processed, then the verification apparatus terminates string comparison. After termination of string comparison, the verification apparatus may create a list of character strings corresponding to the license as a matching result. The verification apparatus may also create a list of character strings not corresponding to the license or may remove a temporarily stored list of character strings not corresponding to the license. The verification apparatus may display status of ongoing verification. The verification apparatus may output verification statuses when binary files are obtained, when character strings to be searched are extracted, and when string matching is performed.

Figure 5:
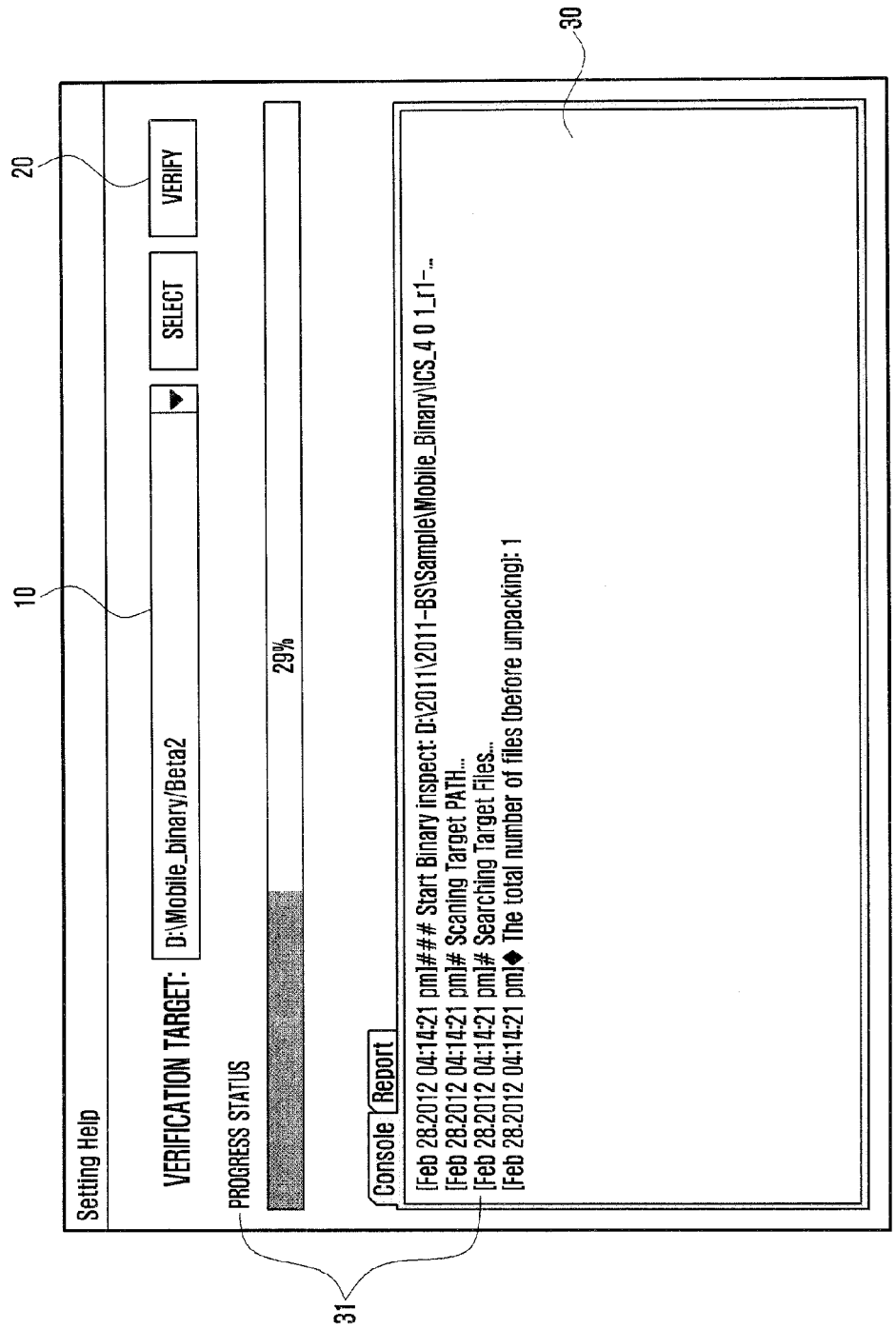
FIG. 5 illustrates a verification status screen for license verification according to an exemplary embodiment of the present invention.

FIG. 5 illustrates a verification status screen for license verification according to an exemplary embodiment of the present invention.

Referring to FIG. 5, the verification apparatus may output progress status of verification on a UI screen. The verification apparatus may display progress status information 31 above the verification information display object 30. The verification apparatus may display at least one of a list of files obtained from the verification target, a list of binary files, the type of the verification target, and an indication as to a decompression, unpacking, and decompilation state of the verification target. The verification apparatus may display progress status information 31 including at least one of a list of files being checked and a list of character strings being matched in the verification information display object 30 and may also include a graphical representation of the progress status. For example, the verification apparatus may represent progress status information 31 using graphs, percentages, or times such as expected verification time, elapsed verification time and expected remaining time, or a percentage of verification operations that have been completed, or any other similar and/or suitable representation of progress status information 31.

The verification apparatus may display the verification target selection object 10 and verification request input object 20 together with progress status information 31. Here, as verification is in progress, the verification target selection object 10 may be shaded, although not shown as such in FIG. 5, so as to disable selection of a new verification target. As verification is in progress, the verification request input object 20 may be presented as a verification halt request input object.

After string matching has been performed in step 400, the verification apparatus displays verification results in step 500.

The verification apparatus may display verification results indicating whether the verification target corresponds to a specific license on the UI screen.

The verification apparatus may generate a verification result report in order to output verification results. The verification result report may include at least one of a list of checked files, a list of checked character strings, a list of verified licenses, a list of files corresponding to licenses, the number of files corresponding to licenses, a list of functions or character strings corresponding to licenses, the level of confidence on license matching, and any other similar and/or suitable information to be reported. Here, the level of confidence of license matching may be evaluated according to the number of character strings corresponding to a specific license and lengths of such character strings, and may be represented as a score or as any other suitable and/or similar indicator.

Figure 6:
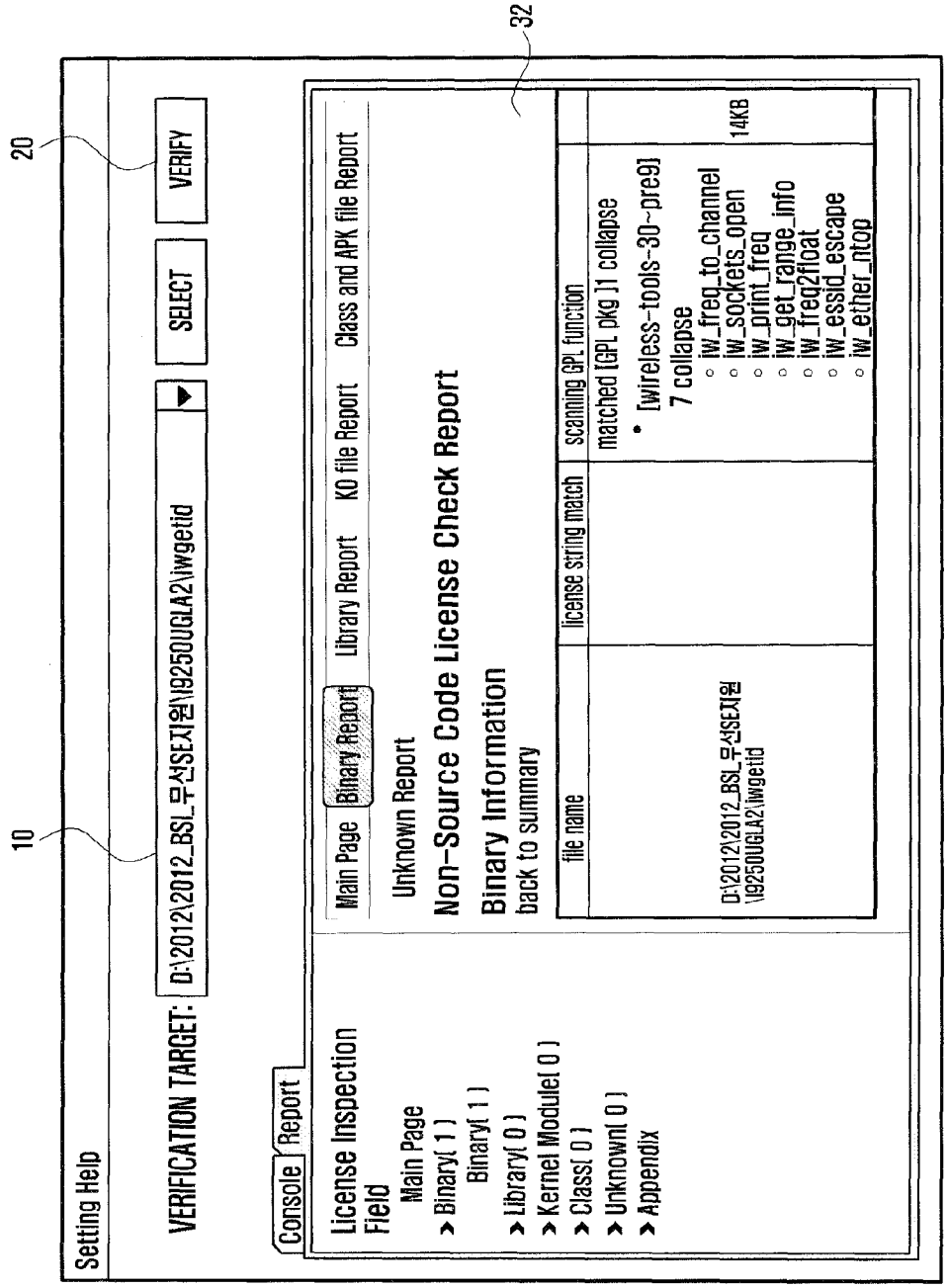
FIG. 6 is an example of a license verification result screen according to an exemplary embodiment of the present invention.

FIG. 6 is an example of a license verification result screen according to an exemplary embodiment of the present invention.

Referring to FIG. 6, the verification apparatus may display verification results 32 in the verification information display object 30. The verification apparatus may display verification results 32 using a list, a frame, or any other similar and/or suitable graphical representation. The verification apparatus may separately display verification results 32 for kernel modules.

Figure 7:
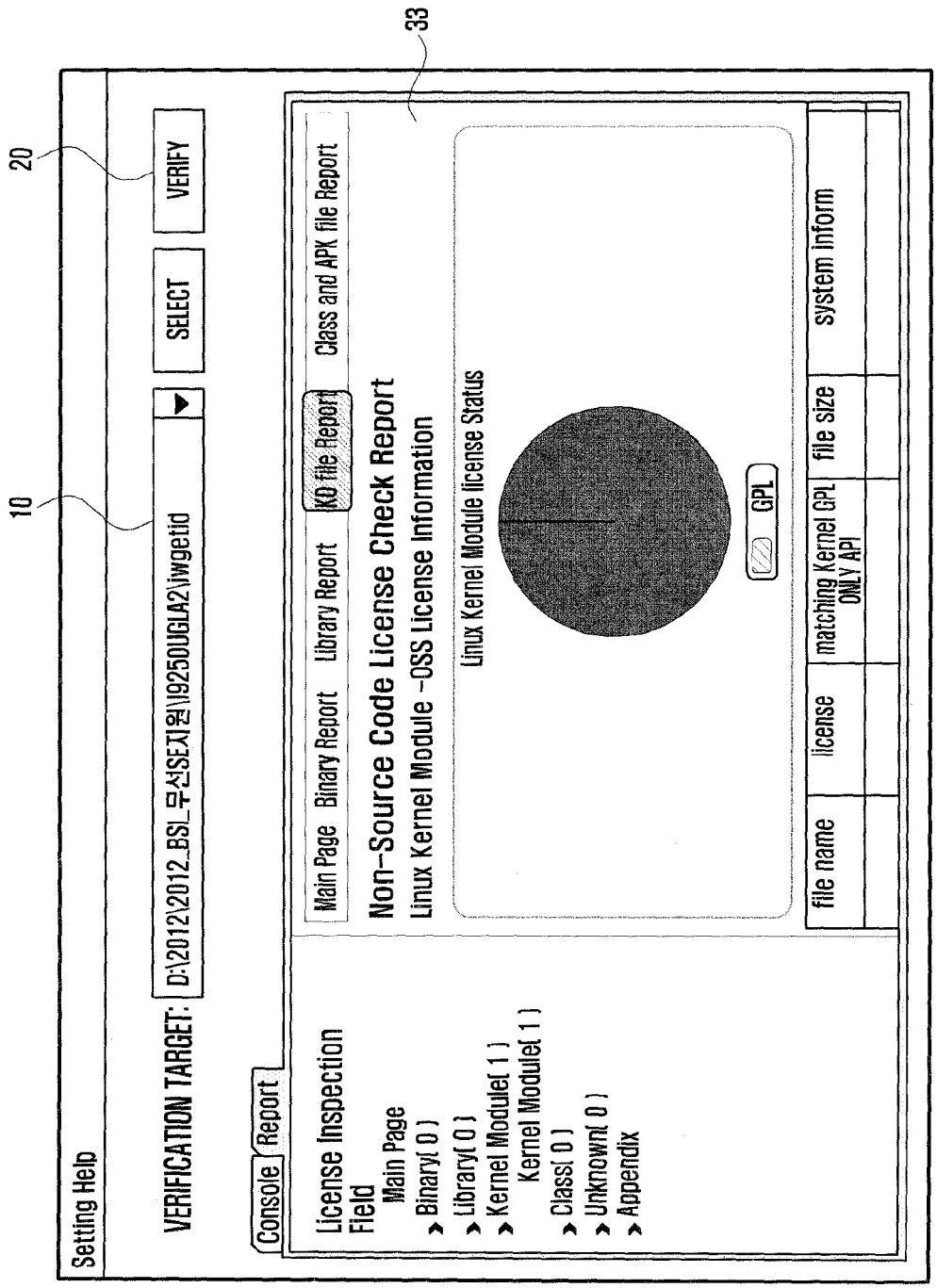
FIG. 7 is another example of a license verification result screen according to an exemplary embodiment of the present invention.

FIG. 7 is another example of a license verification result screen according to an exemplary embodiment of the present invention.

Referring to FIG. 7, the verification apparatus may present verification results 33 using a linear chart, a pie chart, a bar chart, or any other similar and/or suitable graphical representation. For example, for a given verification target, the verification apparatus may represent license matching as a percentage graph on the basis of the number of character strings corresponding to one or more licenses.

As all the procedures or steps of the license verification method described above with respect to the exemplary embodiments of FIGS. 1-7 are not indispensable, and a new procedure or step may be added or an existing procedure or step may be omitted, replaced or moved with respect to a sequence of operations and/or procedures without affecting the subject matter of the present invention.

The license verification method for binary files of the present exemplary embodiments may be implemented as a computer program or may be embodied as computer readable code on a computer readable recording medium, which may be stored in various non-transitory computer readable storage media. The non-transitory computer readable storage media may be any storage medium that can store computer readable data, such as such as a Read-Only Memory (ROM), a Random Access Memory (RAM), a Compact Disc (CD)-ROM, a magnetic tape, a floppy disk, an optical disc, or any other similar and/or suitable type of storage medium. A non-transitory computer readable storage medium may be connected to a particular computer on a network, and the program contained therein may be executed by multiple computers on the network in a distributed fashion.

Figure 8:
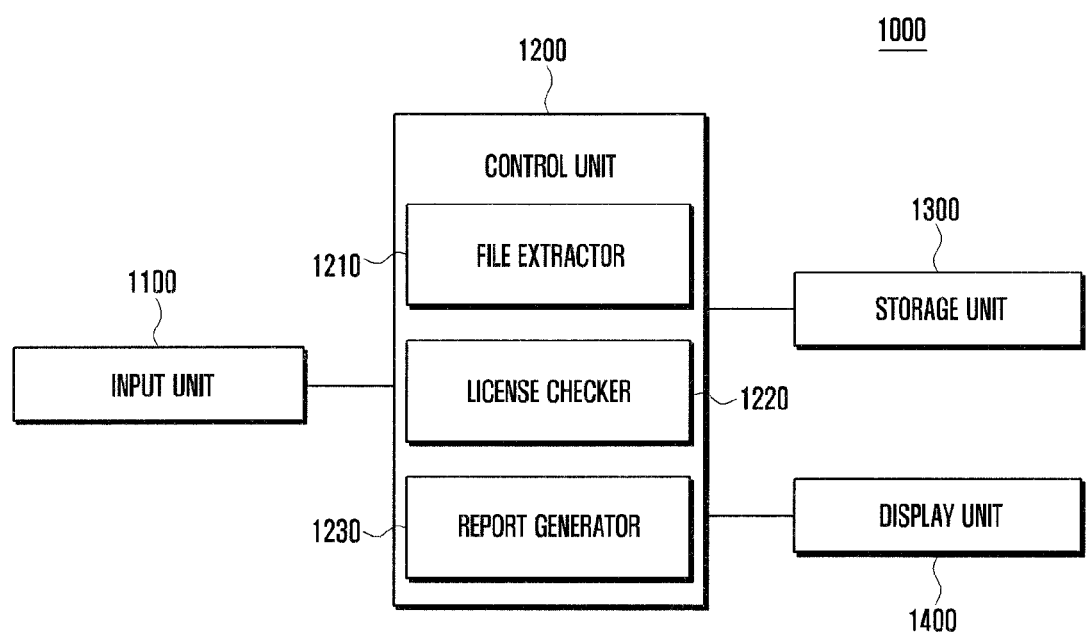
FIG. 8 is a block diagram of a license verification apparatus realizing license verification according to an exemplary embodiment of the present invention.

FIG. 8 is a block diagram of a license verification apparatus realizing license verification according to an exemplary embodiment of the present invention.

Referring to FIG. 8, a verification apparatus 1000 may include an input unit 1100, a control unit 1200, a storage unit 1300, and a display unit 1400. The input unit 1100 may generate an input signal corresponding to a user's manipulation of and/or input to the input unit 1100. The input unit 1100 may include a keyboard, a keypad, a dome switch, a touchpad and/or a touchscreen which may be a resistive or a capacitive type, a jog wheel, and a jog switch, or any other similar and/or suitable type of input device. In an exemplary embodiment of the present invention, the input unit 1100 may receive user input corresponding to issuance of a verification request or selection of a verification target.

The control unit 1200 may control individual components of and the overall operation of the verification apparatus 1000. For example, the control unit 1200 may control the verification apparatus 1000 in order to perform license verification for a specific verification target. The control unit 1200 may include a file extractor 1210, a license checker 1220, and a report generator 1230 for generating reports on the verification result.

The file extractor 1210 obtains binary files from a verification target. The file extractor 1210 may identify a type of the verification target. When the verification target is of a compressed file type or a package file type, then the file extractor 1210 may decompress, unpack or decompile the verification target in order to obtain binary files.

The license checker 1220 may determine whether a binary file, i.e. the verification target, corresponds to a specific license. More specifically, the license checker 1220 may extract a character string to be searched for from the binary file and perform string comparison with respect to a knowledge base. The knowledge base is built on the basis of a license to be verified. The knowledge base may contain at least one character string corresponding to the license, and may be pre-stored in the storage unit 1300. The license checker 1220 compares the extracted character string with the knowledge base. When a character string identical to the extracted character string is present in the knowledge base, then the license checker 1220 may determine that the extracted character string corresponds to the license. The license checker 1220 may create a list of character strings corresponding to the license and may control the storage unit 1300 to temporarily store the created list.

The report generator 1230 may generate a result report on the basis of license verification results for the verification target. The verification result report may include at least one of a list of checked files, a list of checked character strings, a list of verified licenses, a list of files corresponding to licenses, the number of files corresponding to licenses, a list of functions or character strings corresponding to licenses, the level of confidence on license matching, and any other similar and/or suitable results to be reported. Herein, the level of confidence of license matching may be evaluated according to the number of character strings corresponding to a specific license and lengths of such character strings, and may be represented as a score. However, the present invention is not limited thereto, and the level of confidence of license matching may be evaluated and represented according to any suitable and/or similar process and/or element.

In an exemplary embodiment of the present invention, the control unit 1200 may obtain a binary file using the file extractor 1210, may determine whether a character string extracted from the binary file corresponds to a given license through the license checker 1220, and may generate a verification result report through the result report generator 1230 on the basis of a list of character strings determined to correspond to the license. In addition, the control unit 1200 may control the display unit 1400 to display the verification results on the basis of operation status of the file extractor 1210 and on the basis of the license checker 1220 and the generated verification result report. Operations of the control unit 1200 have been described in detail with reference to FIGS. 1 to 8.

The storage unit 1300 may store programs, information and data used for operation of the verification apparatus 1000. In an exemplary embodiment of the present invention, the storage unit 1300 may temporarily or semi-permanently store knowledge bases for license verification, temporary data generated in the verification process, and verification result reports. In another exemplary embodiment of the present invention, the storage unit 1300 may store a program that is designed to cause the verification apparatus 1000 to perform license verification in a form of computer readable code. The program or computer readable code stored in the storage unit 1300 may be executed by the control unit 1200.

The storage unit 1300 may include at least one of various types of storage media, such as flash memory, hard disks, multimedia memory cards such as micro, Secure Digital (SD) or xD memory cards, RAM, Static RAM (SRAM), ROM, Programmable ROM (PROM), Electrically Erasable PROM (EEPROM), magnetic memory, magnetic disks, optical discs or any other similar and/or suitable type of storage media.

The display unit 1400 displays or outputs information processed by the verification apparatus 1000. For example, the display unit 1400 may display a UI screen in relation to operations of the verification apparatus 1000. The display unit 1400 may be realized using a technology based on at least one of Liquid Crystal Display (LCD), Thin Film Transistor Liquid Crystal Display (TFT-LCD), Organic Light-Emitting Diodes (OLED), flexible display, 3Dimensional (3D) display, or any other similar and/or suitable display type or technology. The display unit 1400 combined with a touch sensor and/or a proximity sensor may act as a touchscreen. In such a case, the display unit 1400 may be treated as an input means, for example the input unit 1100, as well as a display means.

In an exemplary embodiment, the display unit 1400 may display a verification target selection object 10, verification request input object 20, and verification information display object 30. The display unit 1400 may display the verification target selection object 10 in order to receive a target for license verification from the user. The verification target selection object 10 may include a selection object for selecting a verification target, and a verification target display object for displaying a path, a name and an extension of the selected verification target. The verification target selection object 10 may be displayed as text, icons, buttons, images, windows or a combination thereof.

The display unit 1400 may display the verification request input object 20 in order to generate a verification request for a given verification target. During verification, after generation of a verification request, the verification request input object 20 may be used as a verification halt request input object. The verification request input object 20 may be displayed as text, icons, buttons, images, windows or a combination thereof. The display unit 1400 may display the verification information display object 30 in order to output status information regarding a verification target. For example, the verification information display object 30 may output information on at least one of a list of files constituting the verification target, a list of binary files, the type of the verification target, and decompression, unpacking, and decompilation states of the verification target.

During verification, the display unit 1400 may display the verification information display object 30 in order to output verification progress information regarding at least one of a list of files being verified and a list of character strings being checked. After verification, the display unit 1400 may display the verification information display object 30 in order to output a verification result report including at least one of a list of verified files, a list of checked character strings, a list of verified licenses, a list of files matching a license, the number of files matching a license, a list of functions or strings matching a license, and the level of confidence of license matching. The verification information display object 30 may include a window in which verification information is output, and may be presented using text, icons, buttons, images, windows or a combination thereof.

The description of various exemplary embodiments is to be construed as exemplary only and does not describe every possible instance of the present invention. Various changes and modifications are possible on the basis of the above description. It should be understood that many variations and modifications of the basic inventive concept described herein will still fall within the spirit and scope of the present invention as defined in the appended claims and their equivalents.

What is claimed is:

1. A license verification method, the method comprising:
   determining whether a type of a verification target is a binary file type;
   if the type of the verification target is a binary file type, obtaining a binary file and extracting a character string to be searched for from the obtained binary file;
   determining whether the type of the verification target corresponds to a kernel module;
   if the type of the verification target corresponds to the kernel module, obtaining the kernel module and extracting a character string to be searched for from the obtained kernel module separately; and
   comparing the extracted character string from the obtained binary file and the obtained kernel module against a database created according to a license to be verified.

2. The method of claim 1, wherein the obtaining of the binary file comprises:
   identifying a type of a verification target;
   performing at least one of decompressing, unpacking and decompiling the verification target when the verification target type is at least one of a compressed file and a package file; and
   extracting the binary file from at least one of the decompression and decompilation results.

3. The method of claim 1, wherein the extracting of the character string to be searched comprises extracting at least one character string from the obtained binary file.

4. The method of claim 1, wherein the comparing of the extracted character string comprises:
   determining whether a character string matching the extracted character string is present in the database; and
   determining, when the character string matching the extracted character string is present in the database, that the extracted character string corresponds to the license.

5. The method of claim 1, further comprising building the database containing at least one character string corresponding to the license to be verified.

6. The method of claim 1, further comprising displaying at least one of information on the obtained binary file, information on the extracted character string, verification status information, and verification results.

7. The method of claim 1,
   wherein the binary file is composed of binary data, and
   wherein the obtained binary file may be one of an executable file and a library file stored in a storage unit.

8. The method of claim 1, wherein the obtained binary file is disposed in a folder stored in a storage unit.

9. A non-transitory computer readable storage medium storing a program causing at least one processor to perform license verification, the license verification comprising:
   determining a type of a verification target;

if the type of the verification target is a binary file type, obtaining a binary file and extracting a character string to be searched for from the obtained binary file;

if the type of the verification target is a kernel module, obtaining a kernel module and extracting a character string to be searched for from the obtained kernel module separately; and comparing the extracted character string from the obtained binary file and the obtained kernel module against a database created according to a license to be verified.

10. A license verification apparatus, the apparatus comprising:

an input unit configured to receive a license verification request; and a control unit configured to:
determine a type of a verification target,
if the type of the verification target is a binary file type, obtain a binary file and extract a character string to be searched for from the obtained binary file;
if the type of the verification target is a kernel module, obtain the kernel module and extract a character string to be searched for from the obtained kernel module separately; and
compare the extracted character string from the obtained binary file and the obtained kernel module against a database created according to a license to be verified.

11. The apparatus of claim 10, wherein the control unit is further configured to:
identify the type of a verification target, wherein the control unit decompresses, unpacks or decompiles the verification target when the verification target type is at least one of a compressed file and a package file, and extract the obtained binary file from the decompression, unpacking or decompilation results.

12. The apparatus of claim 10, wherein the control unit is further configured to extract the character string composed of representable characters from the obtained binary file.

13. The apparatus of claim 10, wherein the control unit is further configured to:
determine whether a character string matching the extracted character string is present in the database, and
determine, when the matching character string is present in the database, that the verification target corresponds to the license.

14. The apparatus of claim 10, further comprising a storage unit configured to storing store the database,
wherein the control unit is further configured to:
build the database containing at least one character string corresponding to the license to be verified, and store the database in the storage unit.

15. The apparatus of claim 10, further comprising a display unit,
wherein the control unit is further configured to control the display unit to display at least one of information on the obtained binary file, information on the extracted character string, verification status information, and verification results.

16. The apparatus of claim 10,
wherein the obtained binary file is composed of binary data, and
wherein the obtained binary file is one of an executable file and library file stored in a storage unit.

17. The apparatus of claim 10, wherein the obtained binary file is disposed in a folder stored in a storage unit.

* * * * *